United States Patent

[11] 3,595,984

| [72] | Inventor | Henry N. Tachick<br>Pittsfield, Mass. |
| --- | --- | --- |
| [21] | Appl. No. | 36,146 |
| [22] | Filed | May 11, 1970 |
| [45] | Patented | July 27, 1971 |
| [73] | Assignee | General Electric Company |

[54] POWER CABLE TERMINATION
6 Claims, 2 Drawing Figs.

[52] U.S. Cl. .................................................. 174/72 R,
174/73 R, 339/60 R, 339/111, 339/143 C
[51] Int. Cl. .......................................................... H02g 15/02,
H01r 11/32
[50] Field of Search............................................ 174/18, 71
R, 72 R, 73 R, 73 SC, 80, 127, 145, 75 D; 339/59
R, 60 R, 61 R, 136 R, 143 R, 143 C, 101, 102 R,
103 R, 111

[56] References Cited
UNITED STATES PATENTS
| 3,376,541 | 4/1968 | Link .......................... | 174/73 R X |
| 3,509,516 | 4/1970 | Phillips .................. | 174/18 X |
| 3,509,518 | 4/1970 | Phillips .................. | 174/73 R UX |
| 3,513,425 | 5/1970 | Arndt .................... | 339/143 C X |

Primary Examiner—Laramie E. Askin
Attorneys—Franics X. Doyle, Vale P. Myles, Frank L.
Neuhauser, Oscar B. Waddell and Joseph B. Forman ABSTRACT: A tee connector for a pair of power distribution cables and a rigid insulating bushing, comprising a central housing having a pair of parallel-disposed cable termination legs, and a relatively perpendicular leg that is adapted to be directly coupled in watertight, voltage grading relationship to a nonflexible transformer bushing. The housing is capable of withstanding arcing and physical stresses so that the tee connector may be disconnected from the transformer without requiring deenergization of the cable-transformer system. The tee connector is further provided with a conductive coating disposed over its outer surface to equalize voltage gradients, and it includes flexible sealing means for receiving the cables in watertight relationship.

PATENTED JUL 27 1971 3,595,984

Inventor,
Henry N. Jachick,
by Vale P. Myles
His Attorney.

POWER CABLE TERMINATION

BACKGROUND OF THE INVENTION

Recent developments in the electrical distribution field include a trend toward underground placement of power distribution cables and facilities. Underground electrical distribution, required by law in some areas, is often desirable for aesthetic and safety reasons. In the development of practical, economic underground systems, the interface between the underground and associated aboveground facilities has created several problems. In providing electrical power to homes, for instance, the practice has been to couple a main, high-voltage line with a plurality of stepdown distribution transformers for reducing voltage to the level required by consumer devices and for distributing the power from such transformers to individual homes. With the advent of underground distribution, such transformers either take the form of relatively small, aboveground "pad mount" transformers which are connected to underground high voltage cables, or vault-type transformers mounted beneath ground level which are more directly connected to the underground cables of the system. Often, space is at a premium in areas where it is desired to locate such transformers. In addition, for aesthetic purposes, the transformers may be concealed by shrubbery or other means. To facilitate such concealment, and to economize in the construction of such transformers, it is highly desirable that the transformers and associated connection means be as compact as is consistent with good engineering practice and safety standards. However, due to the high voltage present on the main distribution cables, and the large, heavily insulated connector means necessary for coupling such lines to the transformer input connections, considerable space is necessarily allotted within the pad mount transformer enclosure, or the underground transformer vault, for such connectors. In one prior art connection system, for example, the high-voltage cable is coupled to the transformer by means of a first elbow connector module, an associated switch module, and a bushing which adapts the switch module to the transformer housing and electrically connects the elbow connector module to one side of the primary winding of the transformer. Further conductor means are provided within the transformer to connect the high-voltage side of the primary winding to a second bushing and associated switch module, which are coupled to a second elbow connector module for continuing the high voltage connection by means of a further cable to a subsequent transformer. It will thus be seen that in such a prior art arrangement a total of six connector elements is necessary to provide a circuit supplying high-voltage power to a transformer and to a pair of high-voltage cables leading respectively to and from the transformer.

In another prior art system, a tee is provided and interposed in a high-voltage cable so that a first cable may be introduced into one leg of the tee, and a second cable into its other leg thereby to provide a circuit for supplying power to further transformers. The third, or main, leg of such a tee arrangement normally comprises a male switch module of a type which is adapted to switchably mate with a standard elbow connector module. A cable is normally connected to one end of the elbow connector module and is also connected directly to a primary bushing on the transformer. The bushing, of course, has a conductor that is electrically connected to the primary winding of the transformer. As will be recognized by those skilled in the art, the term "basic termination" as used herein indicates an interface element which is not adapted to be disconnected while transmitting current, in contradistinction to a switch module which is designed to withstand arcing and other electrical and physical stresses when its electrical circuit is broken. The last-described system, while it eliminates the redundant elbow connector module of the first described system, still requires a total of four rather bulky elements in order to connect a main power cable to a transformer primary and continue the power circuit past the transformer to other transformers on the system.

SUMMARY OF THE INVENTION

It is therefore an object of the present invention to provide means for efficiently coupling a main power cable to a distribution transformer while continuing the cable circuit for energizing successive transformers, without requiring the use of a plurality of connector modules.

It is a further object of the present invention to provide a tee connector for coupling a high-voltage cable directly to an energized distribution transformer.

It is a still further object of this invention to provide more efficient and compact means for coupling a high-voltage cable to a distribution transformer than those found in the prior art.

The present invention comprises a tee connector having a pair of coextensive legs each of which is adapted to receive a cable end therein. A first, "main" leg of the tee connector comprises a female connector housing adapted for direct connection to a load-break terminator which may be mounted directly on a transformer. The connector comprises a body of elastomeric insulating material within which is embedded conductive means including a pair of female couplings for receiving the ends of a pair of high-voltage cables, and further coupling means adapted to be electrically connected to a load-break terminator of a type commonly used on transformers. The outer surface of the connector is coated with a thin layer of electrically conductive elastomeric material which extends into the ends of the openings provided for receiving the high-voltage cables, so that the coating serves to equalize voltage gradients over the body of the tee itself as well as between the connector and the ground shields of the cables. Outer ends of the openings for receiving the cable comprise dilatable, annular extensions which fit tightly about the cable periphery and provide a watertight seal therewith.

BRIEF DESCRIPTION OF THE DRAWINGS

Further objects and advantages of the invention will be apparent to those skilled in the art from the following description, considered in conjunction with the accompanying drawings, in which.

DESCRIPTION OF THE PREFERRED EMBODIMENT

Figure 1:
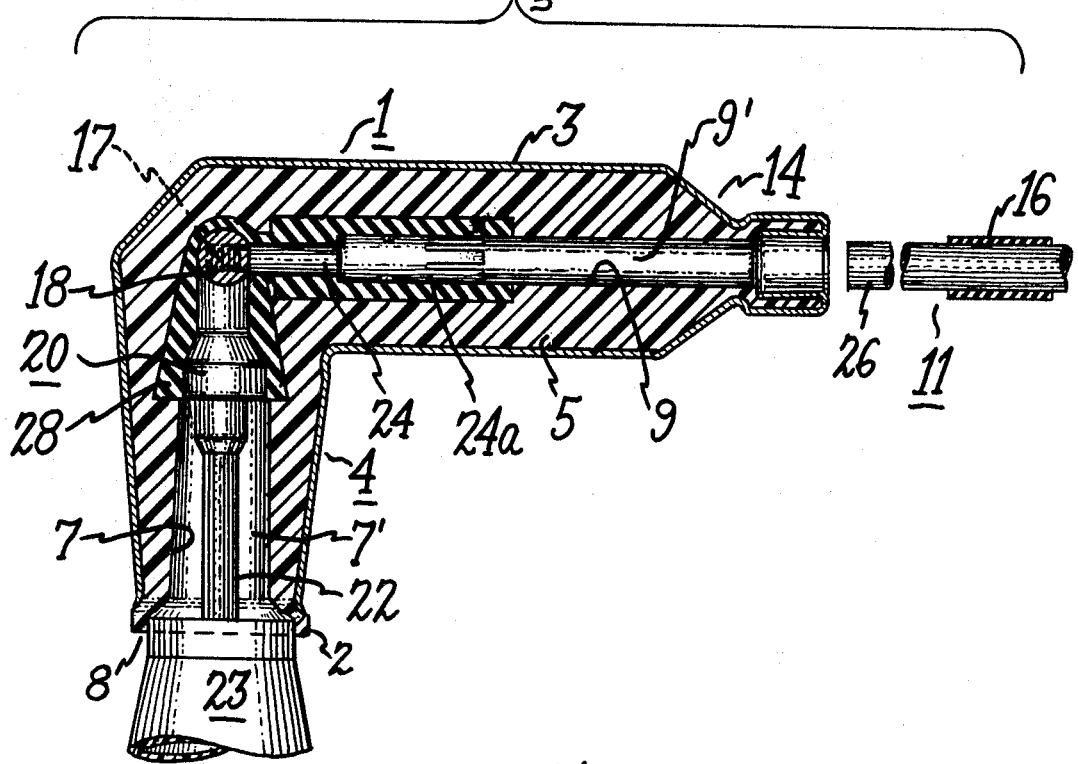
FIG. 1 is a side elevation view, partly in cross section, of a tee connector module constructed in accordance with the teachings of the present invention and illustrated with respect to a high voltage rigid bushing to which the module is coupled, as well as with respect to an insulated cable on which the module may be mounted.

Referring now to the drawings, there is shown a generally elbow-shaped cable termination module 1 constituting a tee connector. The body of the module 1 is molded from an elastomeric insulating material such as is commonly used in the art. This insulating material provides a resilient insulating structure that supports the outer elements of the module, which will be described more fully below. Substantially all of the outer surface of the module, except for an integral gas shield 2 at one end thereof, is covered with a coating 3 of an elastomeric, electrically conductive material. Coating 3 may be formed of any suitable conductive elastomeric material, for example, one of the compositions of sulfur-cured elastomeric compounds that are now available from the E.I. DuPont de Nemours and Company of Wilmington, Delaware, for this purpose may be used. This coating 3 is not claimed as an essential part of the present invention, but its use, in the present manner, is taught more fully by application Ser. No. 27,497, filed Apr. 13, 1970 and assigned to the assignee of the present invention. The coating 3 serves to equalize discontinuous or undesirably steep voltage gradients over the surface of the module, and between the module surface and the outer portion of a cable coupled thereto, as will be further explained below.

In the preferred embodiment, the body of the module 1 is formed to comprise a central portion having a first leg or housing 4 extending outwardly therefrom, and an additional pair of coextensive legs 5 and 6 also extending therefrom at a 90° angle to the leg 4. Leg 4 is provided with wall means 7 defining a longitudinal tapered passageway 7' that extend through it from one end 8 to the central portion of the module 1, at which point it joins with corresponding passageways 9' and 10' defined respectively by wall means 9 and 10, which extend axially through legs 5 and 6, respectively, between this central portion and the outer ends 9a and 10a thereof. Since second and third legs 5 and 6 substantially identical, only the characteristic features of leg 5 will be discussed in detail to explain the invention. Of course, it will be understood that this description of the features of leg 5 applies as well to leg 6. A first end 9a of leg 5 terminates in an extended, generally annular sleeve 12 that has a reduced diameter with respect to the diameter of the body of leg 5. The inside diameter of the passageway 9' partially defined by the walls 9 of sleeve 12 is somewhat smaller than the diameter of a given range of standard cable sizes, such as the diameter of cable 11 which is adapted to be received in the outer end of passageway 9'. The inherent resilience of the elastomeric insulating material from which the housing of module 1 is constructed causes sleeve 12 to dilate upon insertion of cable 11, so the inside of the sleeve tightly grips the outer surface of the cable and seals the passageway 9' defined by wall means 9 from moisture which may be present on the outside surface of the module.

When the module 1 is operatively connected to a high-voltage electric cable it is desirable to provide means for uniformly distributing the voltage gradient about the junction between the module and the exterior ground plane on such a cable. Toward this end, each leg 5 and 6 is provided with a generally conical portion 14 near its outer end, which serves as a transition area for reducing the outer diameter of the leg to a diameter approximating that of its sleeve 12. The transition area thereby affords an electrical stress cone configuration for the conductive coating 3 covering the outer surfaces of the module, so that electric fields developed between the body 1 and the cable 11 will be uniformly graded from the relatively small outer diameter of the cable to the larger diameter of the leg.

In order to properly distribute voltage gradients at the open end 8 of housing leg 4, conductive coating 3 terminates at the inner base of annular gas shield 2 at a point adjacent the upper edge of bushing 23, when the module 1 is connected to bushing 23 as shown in FIG. 1. It will be understood that bushing 23 is also provided with a conductive coating on its outer surface to electrically shield the conductors housed therein. The gas shield 2, although made of insulating material, is sufficiently thin at this point to preclude a discontinuity in the voltage gradient formed by the coating on bushing 23 and the coating 3 on module 1.

It will be noted that the diameter of leg 5 at the outer end of conical portion 14 is somewhat smaller than that of sleeve 12. The thinner wall portion 15 thus constituted forms an angularly flexible coupling between the conical portion 14 of the leg and the resiliently dilatable sleeve 12. This configuration allows angular deflection of sleeve 12 with respect to the longitudinal axis of the leg which may be due to deflection of the extending portion of a cable received therein, without disturbing the watertight sealing contact provided between the internal wall of sleeve 12 and the outer surface of the cable.

A further feature of this portion of the connector tee is the extension of conductive coating 3 about the ends 9a and 10a, and within, sleeves 12 such that a portion of the inner periphery of each sleeve 12 is electrically connected to the outer surface of its respective leg. As is taught by the above-mentioned U.S. Pat. application Ser. No. 27,497, the coating disposed on the inner surfaces of sleeve 12 is brought into electrical contact with a semiconductive coating 16 disposed upon the outer surface of cable 11. This arrangement provides a continuous electrical path from the outer surface of the cable over the surface of the connector module and distributes electrical stresses thereon, resulting in a smooth, uniform voltage gradient around the cable termination junction.

Conductive terminal means 18 are disposed within the central portion of connector module 1 and comprise a first female connector 20 disposed within the first housing or leg 4 of the connector module and mounted in communication with the passageway 7' defined by wall means 7. A rodlike conductive element 22 is mounted in connector 20 by being screwed into it, and extends toward bushing 23 to which it is adapted to be electrically coupled when mounted in the connected relationship shown in FIG. 1. A further portion of the conductive terminal means 18 comprises in a second rodlike conductive element 24, which includes a second female connector 24a adapted to receive the end 26 of cable 11. As illustrated in FIG. 1, end 26 comprises a metallic contact that is crimped over the ends of the conductors forming the cable 11, in a manner well-known in the art.

The conductive elements 24 extending from the second female connector 24a are physically united with adjacent members extending from first female connector 20 by any suitable means, such as the threaded connection 17 illustrated in FIG. 1. The conductive terminal means 18 thus provides a conductive circuit for electrically connecting the conductors of cable 11 to the windings of a transformer by way of conductive element 22 and the conductor (not shown) in bushing 23, which may be connected to a transformer. The conductive means 18 may advantageously be embedded in a premolded body of resilient, electrically conductive material 28 that serves to shield the junctions between the elements 20 and 24 and conductive means 18 to evenly distribute the electric fields about these junctions, in a manner well known in the cable termination art.

Figure 2:
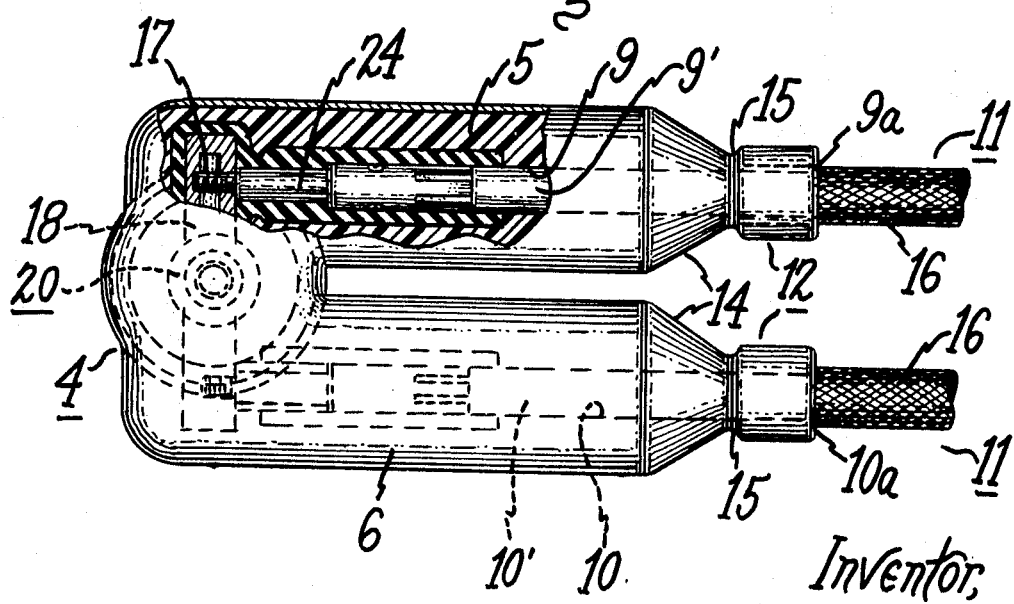
FIG. 2 is a bottom view, partly in cross section, of the tee connector module of FIG. 1, showing the module connected to a pair of insulated cables.

FIG. 2 shows the tee connector module 1 of the present invention with a pair of high-voltage electric power cables 11 operatively inserted in the passageways 9' and 10' of legs 5 and 6 thereof. As described above with reference to one leg 5 of module 1, resilient annular sleeve 12, that are dilated upon the insertion of cables 11 therein, firmly grip the outer surfaces of the cables, sealing the passageways 9' and 10' defined by wall means 9 and 10 within legs 5 and 6 from moisture which may be present outside the module. Further, conductive coating 3 is brought firmly into contact with semiconductive coating 16 of the cables 11 to thus distribute the electric fields supported by voltage within cables 11 and eliminate detrimentally high voltage gradients on the surface thereof. Crimped connectors 26, affixed to the ends of conductors of cable 11, are firmly received in sliding contact relationship within female connectors 24 and are held therein by a detent action due to the interengaging configuration of the mating connectors as well as being secured by the pressure fit of cables 11 in passageways 9' and 10'. One end of the female connectors 24 threadedly engages, at 17 (FIG. 1), conductive member 20 for providing a physically strong, electrical conductive path therebetween. The cables inserted in legs 5 and 6 are electrically coupled together by extensions of female connector 20 in the manner of a tee, whereby current introduced into module 1 by one of said cables may flow to a primary transformer winding coupled through bushing 23 to female connector 20 disposed within first leg 4 of the tee, and also to the second cable disposed within the remaining leg of the tee. Therefore, by the means described, current may be introduced to the primary winding of a transformer from a high-voltage cable, and simultaneously high-voltage power is provided by means of a second cable connected to the other leg of the tee for energizing further transformers on a distribution system.

The configuration of the first, or main, leg 4 of the tee including female contact 20, the passageway 7' defined by wall means 7, and gas shield 2 comprises a housing adapted to mate with the bushing 23 and its associated contact (not sown) which may comprise a standardized load-break terminator of a type now available commercially for use upon underground distribution transformers. Load-break terminators, as opposed to basic terminations, are designed to be switchably operated; that is, to be connected to or disconnected from current-carrying members without the need for deenergizing the members. In this manner, the tee connector module taught by the present invention can be readily connected to or disconnected from a load-break terminator in the same manner as a standard elbow connector module might be coupled to such a terminator. As set forth above, a uniform voltage gradient is provided about the first leg 4 of the tee in a manner similar to that provided at the cable-entry ends 9a and 10a of the second and third legs 5 and 6, so a switching operation is fairly well shielded, particularly if it is completed rapidly enough to prevent a large volume of ionized gas from being blown around gas shield 2.

In addition to being adapted to couple directly to a standard load-break terminator extending from the surface of a transformer, it will be seen that in the preferred embodiment the second and third legs, 5 and 6 of the tee, extend parallel to one another, and substantially perpendicular to the housing or first leg 4 of the module 1. Since high-voltage electric cables are often coupled to pad-mount transformers from a common duct communicating with an underground conduit, in many instances the cables will approach the transformer terminals from a common direction and, thus, be parallel and adjacent to one another. Space is thus conserved by providing means for receiving these cables which are in close proximity with each other, and allowing the cables to maintain their original relative positions in a safely insulated modular arrangement that is suitable for "dead front" rating. Further, the elbow configuration of the tee connector module taught by the present invention allows the module, and thus the load-break terminator to which it is coupled, to be placed in closer proximity to the enclosure disposed about the transformer than would otherwise be possible.

It will thus be seen that improved means for facilitating the connection of a distribution transformer to a plurality of high-voltage cables are provided, without the necessity for providing a plurality of individual connector modules to adapt to cable terminations to standard, rigid transformer bushing that do not incorporate resilient water-seal means. Further modifications and improvements of the embodiment of the invention disclosed herein will be apparent to those skilled in the art, and it is intended that the appended claims encompass all such modifications and improvements as are within the true spirit and scope thereof.

What I claim as new and desire to be secured by Letters Patent of the United States is:

1. An electric power cable termination module comprising: a body of elastomeric insulating material, said body comprising a central portion having first, second and third legs extending outwardly therefrom, said body further having a coating of electrically conductive material mounted on a major portion of the outer surface thereof to form an electrically conductive path from a point adjacent one end of the body to a second point adjacent the other end of the body;

said first leg defining a passageway for receiving in watertight, voltage grading relationship a rigid insulating bushing including high voltage electrical contact means embedded therein and a switchable, load-break means for extinguishing arcs formed between said embedded contact means and an electrically energized conductor separated therefrom;

said second and third legs each comprising wall means defining a passageway extending through each of said legs from one end to the other thereof for receiving cables having a semiconductive outer shield disposed thereon, a portion of said wall means at said one end having said coating of electrically conductive material disposed therein and being relatively dilatable for receiving said cable in watertight sealing relationship, and for holding said conductive coating in electrical contact with said semiconductive outer shield on said cable; and conductive means disposed within the central portion of said body and having contiguous electrically conductive rodlike members extending at least partially into each of said legs, respectively, to make electrical contact with said cables and said contact means carried by said bushing when the termination module is coupled in operative relation to said cables and bushing.

2. An electric power cable termination module as recited in claim 1, wherein said second and third legs each have a generally conical outer surface portion near said one end thereof to afford an electrical stress cone for grading electric fields developed when an energized high-voltage cable is disposed within said passageway, and wherein said relatively dilatable portion of said wall means comprises a generally cylindrical body portion formed integrally with said conical outer surface portion and extending outward therefrom, the outer end of the generally cylindrical portion of said body comprising said one end of each of said legs.

3. An electric power cable termination module as recited in claim 2, wherein said second and third legs are substantially parallel.

4. An electric power cable termination module as recited in claim 3, wherein said first leg is substantially perpendicular to said second and said third legs.

5. An electric power cable termination module, as recited in claim 4, further including a gas shield formed integrally with said first leg around the outer end thereof, said conductive coating terminating at the inner end of said gas shield thereby to reduce the risk of ionized gases forming a conductive path from an arc formed between the contact in said first leg and a contact in a bushing to which the first leg is adapted to be coupled, while simultaneously providing a substantially continuous voltage gradient through the insulating wall formed by said gas shield when said module is coupled in operating position to a bushing.

6. An electric power cable termination apparatus comprising a termination module having an elastomeric insulating body with an electrically conductive coating bonded to substantially the entire outer surface thereof, said module having a central portion with integrally formed first, second and third legs extending outward therefrom, said first leg including wall means that define a tapered passageway through it generally concentric with the longitudinal axis thereof, and further including a rodlike conductive element mounted in said passageway and spaced approximately equidistant from the tapered walls thereof, said second and third legs being generally parallel to one another and each including wall means that define generally cylindrically shaped passageways therethrough, and further each including a conductive element mounted in said passageway and electrically connected to the conductive element in the first leg, said conductive elements in the first and second legs being adapted to form a sliding, releasable contact with a terminal end of an electric cable when the cable is inserted into the respective passageways of said legs, in combination with a first and second cable mounted respectively in the passageways of said first and second legs in electrical contact with the conductive elements therein, and further combined with a high voltage bushing having a rigid frustoconical outer surface that complements the tapered surface of the passageway of said first leg, said bushing being mounted in said tapered passageway to form a watertight seal therewith and to complete an electrical circuit between a contact mounted in said bushing and the conductive element extending into the tapered passageway, whereby said module affords a common electrical connection between both of said cables and and the contact in said bushing while providing a uniform voltage grading shield around all of the connections between it and said cables and bushing contact.